United States Patent
Olson et al.

(10) Patent No.: US 8,602,060 B2
(45) Date of Patent: Dec. 10, 2013

(54) MULTIPLEXING CONTROL VALVE

(75) Inventors: Bret M. Olson, Whitelake, MI (US);
Philip C. Lundberg, Keego Harbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 398 days.

(21) Appl. No.: 12/549,523

(22) Filed: Aug. 28, 2009

(65) Prior Publication Data

US 2010/0072408 A1 Mar. 25, 2010

Related U.S. Application Data

(60) Provisional application No. 61/098,815, filed on Sep. 22, 2008.

(51) Int. Cl.
*F16K 11/07* (2006.01)

(52) U.S. Cl.
USPC ............. 137/625.65; 137/625.68; 137/625.69

(58) Field of Classification Search
USPC ............ 137/625.65, 625.68, 625.69; 251/282
See application file for complete search history.

(56) References Cited

U.S. PATENT DOCUMENTS

| | | | | |
|---|---|---|---|---|
| 3,186,424 A | * | 6/1965 | Peach ...................... | 137/625.68 |
| 4,096,880 A | * | 6/1978 | Lemmon et al. ......... | 137/625.68 |
| 4,227,549 A | * | 10/1980 | Adams ...................... | 137/625.69 |
| 4,313,468 A | * | 2/1982 | Patel ......................... | 137/625.69 |
| 5,247,965 A | * | 9/1993 | Oka et al. .................. | 137/625.65 |
| 5,248,126 A | * | 9/1993 | Pruss et al. ..................... | 251/368 |
| 5,571,248 A | * | 11/1996 | Seetharaman et al. ... | 137/625.65 |
| 5,878,782 A | * | 3/1999 | Nakajima ................. | 137/625.65 |
| 6,289,921 B1 | * | 9/2001 | Neuhaus et al. ........... | 137/454.5 |
| 6,315,268 B1 | | 11/2001 | Cornea et al. | |
| 6,357,480 B1 | * | 3/2002 | Oyama ...................... | 137/625.65 |
| 6,527,249 B2 | * | 3/2003 | Niimi et al. ............... | 137/625.69 |
| 6,609,538 B2 | * | 8/2003 | Royle ....................... | 137/625.65 |
| 7,082,965 B2 | * | 8/2006 | Holmes et al. ........... | 137/625.65 |
| 7,131,410 B2 | * | 11/2006 | Kondo et al. ............... | 123/90.17 |

FOREIGN PATENT DOCUMENTS

| CN | 2081911 | | 7/1991 |
|---|---|---|---|
| CN | 1098484 | | 2/1995 |
| WO | WO 2006079382 A1 | * | 8/2006 |

* cited by examiner

*Primary Examiner* — Eric Keasel

(57) ABSTRACT

A multiplexing valve assembly includes a valve slidably disposed within a valve body, hydraulic module, or packaged in a stand alone solenoid cartridge. A plurality of fluid passages communicate with the multiplexing valve assembly. The valve includes a plurality of lands. Radial fluid passages disposed in the lands and a longitudinal fluid passage disposed in the valve allow hydraulic fluid within the fluid passages to be selectively exhausted via a single exhaust port. Movement of the valve within the valve body directs hydraulic fluid from one or more input fluid passages to a plurality of outlet fluid passages. The valve is actuated directly by an armature in the solenoid directly acting on the valve or through hydraulic fluid controlled by a solenoid.

8 Claims, 3 Drawing Sheets

MULTIPLEXING CONTROL VALVE

CROSS-REFERENCE TO RELATED APPLICATIONS

This application claims the benefit of U.S. Provisional Application No. 61/098,815, filed on Sep. 22, 2008, which is hereby incorporated in its entirety herein by reference.

FIELD

The invention relates generally to a multiplexing control valve for a transmission, and more particularly to a multiplexing control valve for a transmission having a reduced number of exhaust ports and operable to be directly actuated by a solenoid or by a hydraulic fluid.

BACKGROUND

The statements in this section merely provide background information related to the present disclosure and may or may not constitute prior art.

Typical automatic and dual clutch transmissions employ a hydraulic control system operable to perform various functions within the transmission. These functions include actuating torque transmitting devices, as well as cooling and lubricating the components of the transmission. The hydraulic control system typically includes a valve body having a plurality of valves located therein. These valves are connected via a plurality of fluid passages formed within the valve body and within various components of the transmission, such as shafts.

A pressurized hydraulic fluid is communicated through these fluid passages to the various valves within the control system. The valves are then selectively actuated to control the flow of the pressurized hydraulic fluid through the transmission. While these valves are useful for their intended purpose, there is a constant desire to reduce the complexity and packaging size of the control system by reducing the number of required fluid passages, by reducing the packaging size of the valve assembly itself, by reducing part counts, and by reducing power consumption. Accordingly, there is a need in the art for a valve assembly that achieves these goals while maintaining sealing and functionality within the control system.

SUMMARY

The present invention provides a multiplexing valve assembly. The multiplexing valve assembly includes a valve slidably disposed within a valve body. A plurality of fluid passages communicate with the multiplexing valve assembly. The valve includes a plurality of lands. Radial fluid passages disposed in the lands and a longitudinal fluid passage disposed in the valve allow hydraulic fluid within the fluid passages to be selectively exhausted via a single exhaust port. Movement of the valve within the valve body directs hydraulic fluid from one or more input fluid passages to a plurality of outlet fluid passages.

In one aspect of the present invention, the multiplexing valve assembly includes two or more lands each having a radial fluid passage. The number of lands will be determined by the number of input fluid passages needing to be multiplexed.

The multiplex valve can be designed as a cartridge style valve, similar to variable force solenoids used in hydraulic systems. The multiplex valve and spring is packaged within a sleeve. A solenoid magnetic coil can be integrated onto the end of the valve and sleeve assembly to provide actuation directly through the solenoid armature. Alternatively, the solenoid can be a stand alone unit hydraulically connected to the valve and sleeve assembly.

In another aspect of the present invention, the valve is moved by a solenoid.

In yet another aspect of the present invention, the solenoid is an on/off solenoid operable to move the valve between two positions using hydraulic fluid or using the solenoid armature to act on the valve.

In yet another aspect of the present invention, the solenoid is a variable force solenoid operable to move the valve between a plurality of positions via direct actuation or hydraulic fluid.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
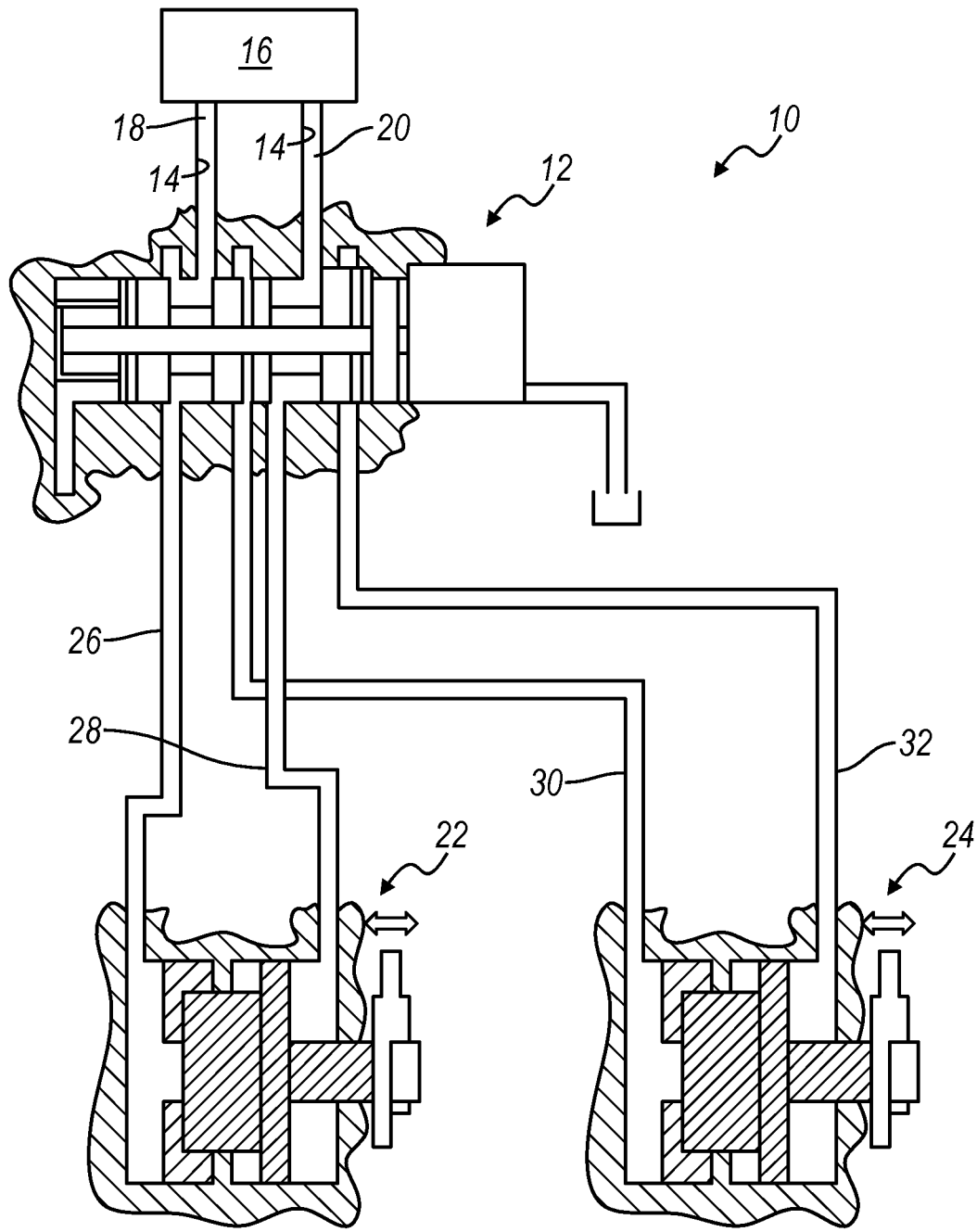
FIG. 1 is a schematic diagram of a portion of an exemplary hydraulic control system having a multiplexing valve assembly according to the principles of the present invention.

With reference to FIG. 1, a portion of an exemplary hydraulic control system for use in a transmission of a motor vehicle is illustrated schematically and generally indicated by reference number 10. The hydraulic control system 10 includes a multiplexing valve assembly 12 according to the principles of the present invention that is operable to control various components within the transmission using a pressurized hydraulic fluid 14. For example, the hydraulic control system 10 includes a pressurized hydraulic fluid source 16, such as a pump, accumulator, or intermediary hydraulic controls, that communicate the pressurized hydraulic fluid 14 to the multiplexing valve assembly 12 via a first input fluid flow path 18 and a second input fluid flow path 20. The first and second fluid flow paths 18, 20 may take various forms, such as channels or passages formed in a valve body, and may have various lengths and branches without departing from the scope of the present invention.

The pressurized hydraulic fluid 14 is selectively communicated through the multiplexing valve assembly 12 to a first actuating device 22 and a second actuating device 24, as will be described in greater detail below. The multiplexing valve assembly 12 communicates with the first actuating device 22 via a first fluid flow path 26 and a second fluid flow path 28 and communicates with the second actuating device 24 via a third fluid flow path 30 and a fourth fluid flow path 32. The first, second, third, and fourth fluid flow paths 26, 28, 30, 32 may take various forms, such as channels or passages formed in a valve body or any other hydraulic system, and may have various lengths and branches without departing from the scope of the present invention. Moreover, in the example provided the first and second actuating devices 22, 24 are piston assemblies that are moveable by the pressurized hydraulic fluid 14 to actuate a shift rail (not shown) in a synchronizer assembly (not shown). However, it should be appreciated that the multiplexing valve assembly 12 may control or communicate with components other than the exemplary first and second actuating devices 22, 24, such as clutches or brakes, other valve assemblies, and other parts within the transmission without departing from the scope of the present invention.

Figure 2:
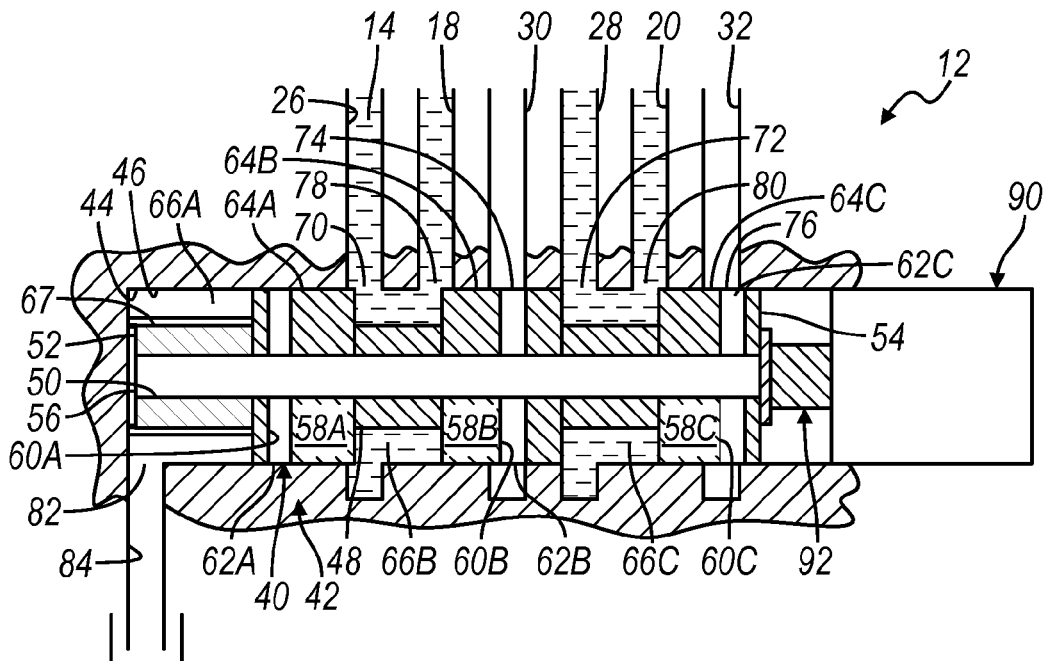
FIG. 2 is a schematic diagram of an embodiment of a multiplexing valve assembly according to the principles of the present invention in a first position.

Turning now to FIG. 2, the multiplexing valve assembly 12 includes a valve 40 located within a valve body 42. More specifically, the valve body 42 includes an inner surface 44 that defines a bore 46 and the valve 40 is slidably supported within the bore 46. The valve body 42 is preferably formed as an integral component of the transmission. The valve 40 includes a central body 48 that extends along a length of the bore 46. The central body 48 defines a center fluid passage 50 that extends coaxially with the valve 40 from a first end 52 of the valve 40 to a second end 54 of the valve 40. An opening 56 is disposed in the first end 52 and communicates with the center fluid passage 50. A plurality of lands 58A-C extend from the central body 48 and searingly engage the inner surface 44 of the bore 46. The lands 58A-C are spaced along the length of the central body 48. Each land 58A-C defines a radial fluid passage 60A-C, respectively. The radial fluid passages 60A-C communicate between the central fluid passage 50 and pairs of openings 62A-C on outer surfaces 64A-C of the lands 58A-C, respectively. In the example provided, the radial passages 60A-C communicate each with a pair of radial openings 62A-C located on opposite sides of the lands 58A-C. However, it should be appreciated that each radial passage 60A-C may communicate with only a single opening located on each of the lands 58A-C without departing from the scope of the present invention.

The lands 58A-C cooperate with the inner surface 44 of the valve body 42 to define a plurality of fluid chambers 66A-C. A biasing member 67, such as a spring, is located in fluid chamber 66A and engages the first end 52 of the valve 40. The valve 40 is moveable within the bore 46 between a first position, shown in FIG. 2, a second or neutral position, shown in FIG. 3, and a third position, shown in FIG. 4. It should be appreciated that the second position or neutral position is not used when the valve 40 is actuated using an on/off style solenoid. The biasing member 67 is operable to bias the valve 40 to the third position shown in FIG. 4.

The valve body 42 further defines a plurality of ports that connect with the fluid flow paths 18, 20, 26, 28, 30, 32. In the example provided, the valve body 42 includes a first outlet port 70 that communicates between the bore 46 and the first fluid flow path 26. The first outlet port 70 is located at an end of the bore 46 proximate the first end 2 of the valve 40. A second outlet port 72 communicates between the bore 46 and the second fluid flow path 28. A third outlet port 74 communicates between the bore 46 and the third fluid flow path 30. The third outlet port 74 is located between the first and second outlet ports 70, 72. A fourth outlet port 76 communicates between the bore 46 and the fourth fluid flow path 32. The fourth outlet port 74 is located near an end of the bore proximate to the second end 54 of the valve 40. A first inlet port 78 communicates between the bore 46 and the first input fluid flow path 18. The first inlet port 78 is located between the first and third outlet ports 70, 74. A second inlet port 80 communicates between the bore 46 and the second input fluid flow path 20. The second inlet port 80 is located between the second and fourth outlet ports 72, 76. Finally, an exhaust port 82 communicates between the fluid chamber 66A in the bore 46 and an exhaust fluid flow path 84. It should be appreciated that the exhaust fluid flow path 84 has low pressure or no back pressure. It also should be appreciated that various other arrangements of fluid communication channels and ports may be employed without departing from the scope of the present invention. For example, a single input fluid port may be employed with two outlet fluid ports, thereby requiring only two lands, without departing from the scope of the present invention.

Figure 3:
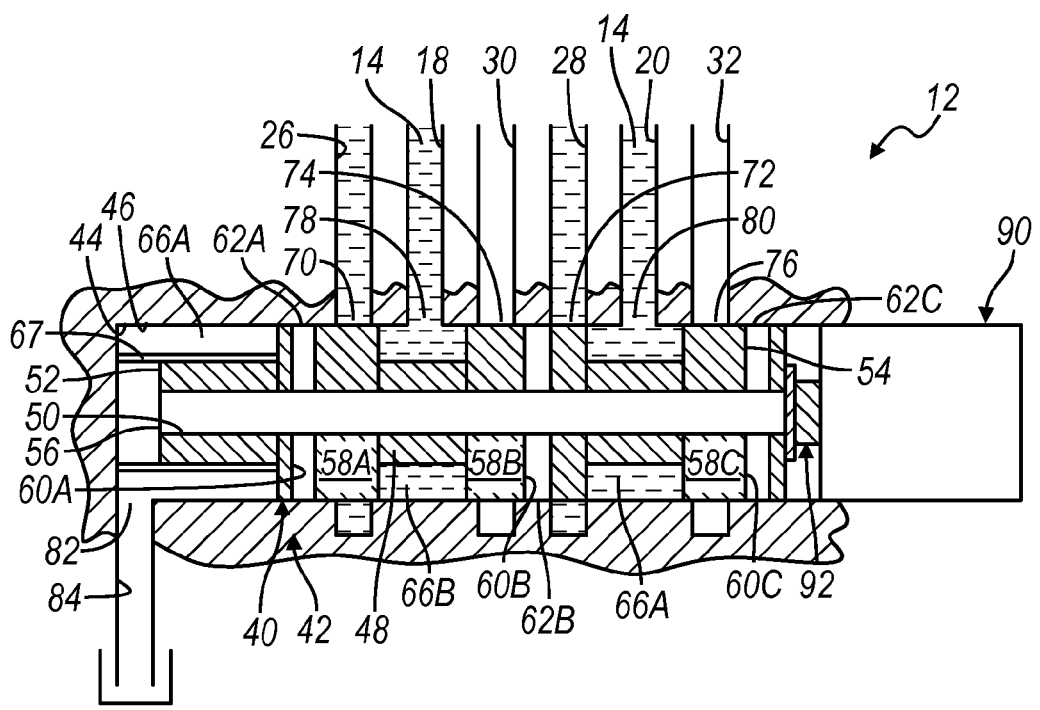
FIG. 3 is a schematic diagram of an embodiment of a multiplexing valve assembly according to the principles of the present invention in a second position.
Figure 4:
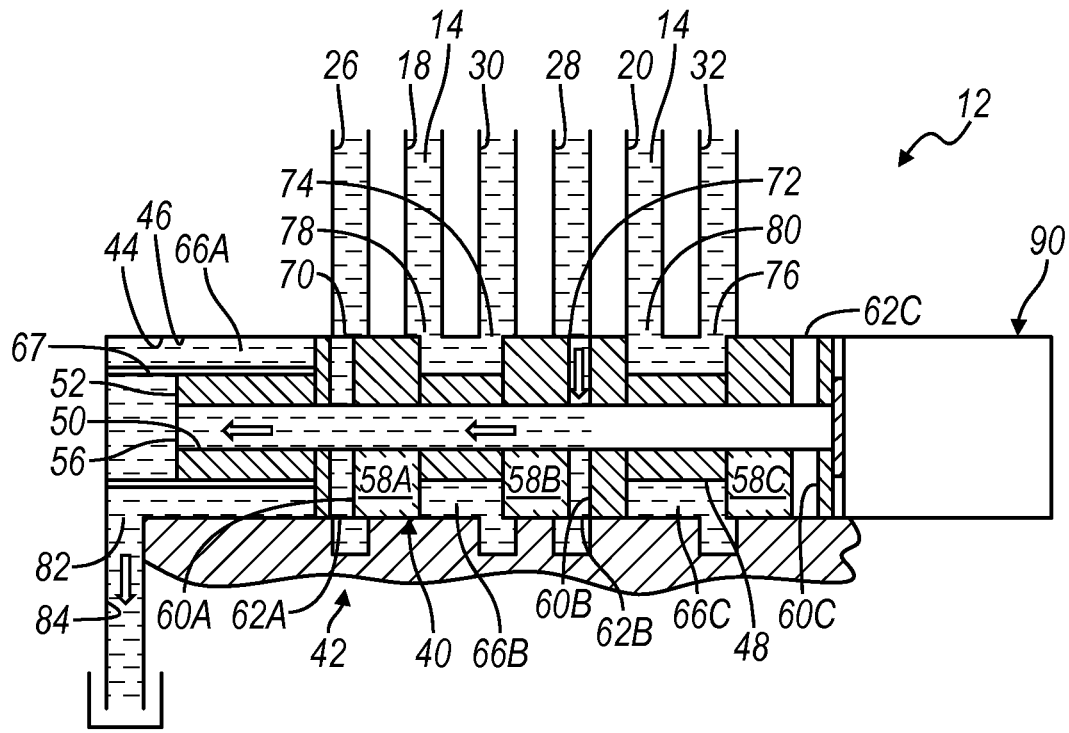
FIG. 4 is a schematic diagram of an embodiment of a multiplexing valve assembly according to the principles of the present invention in a third position.

The valve 40 is moved between the plurality of positions shown in FIGS. 2-4 by a solenoid 90. The solenoid 90 includes an armature 92 that communicates through the bore 46 and contacts the second end 54 of the valve 40. Upon receipt of a control signal, the solenoid 90 is operable to move the armature 92 between a plurality of positions. Movement of the armature 92 in turn moves the valve 40 within the bore 46 between the first, second, and third positions illustrated in FIGS. 2-4 against the biasing force of the biasing member 67. The solenoid 90 is preferably a variable force solenoid that is operable to move the armature 92 from a variety of positions, as shown in FIGS. 2-4. In an alternate embodiment, the solenoid 90 may be an on/off solenoid operable to position the valve in only the first and third positions illustrated in FIGS. 2 and 4. In yet another embodiment (not shown), the solenoid 90 may communicate with the second end 54 of the valve 40 via a hydraulic fluid in place of the armature 92.

As noted above, the multiplexing valve assembly 12 is operable to selectively transmit the hydraulic fluid 14 from the first and second input flow paths 18, 20 through to a combination of the first, second, third, and fourth fluid flow paths 26, 28, 30, 32 via movement of the valve 40 within the valve body 42. For example, in order to provide hydraulic fluid 14 to the first and second fluid flow paths 26, 28, the solenoid 90 is activated such that the armature 92 moves the valve 40 to the first position, as shown in FIG. 2. Hydraulic fluid 14 enters the multiplexing valve assembly 12 from the first input fluid flow path 18, through the first inlet port 78 into fluid chamber 66B. The hydraulic fluid 14 is then directed out the first outlet port 70 to the first fluid flow path 26. Hydraulic fluid 14 also enters the multiplexing valve assembly 12 from the second input fluid flow path 20, through the second inlet port 80 into fluid chamber 66C. The hydraulic fluid 14 is then directed out the second outlet port 72 to the second fluid flow path 28. Any hydraulic fluid 14 located in the third fluid flow path 30 communicates through the third fluid outlet port 74, through the opening 62B in land 58B, through the radial fluid passage 60B to the center passage 50, out through the first end 52 of the valve 40 through the fluid chamber 66A and out the exhaust port 82. Likewise, any hydraulic fluid 14 located in the fourth fluid flow path 30 communicates through the fourth fluid outlet port 76, through the opening 62C in land 58C, through the radial fluid passage 60C to the center passage 50, out through the first end 52 of the valve 40 through the fluid chamber 66A and out the exhaust port 82.

In order to prevent the hydraulic fluid 14 from entering any of the fluid flow paths 26, 28, 30, 32, the solenoid 90 is activated such that the armature 92 moves the valve 40 to the second position, as shown in FIG. 3. Hydraulic fluid 14 enters the multiplexing valve assembly 12 from the first input fluid flow path 18 through the first inlet port 78 into fluid chamber 66B and hydraulic fluid 14 also enters the multiplexing valve assembly 12 from the second input fluid flow path 20, through the second inlet port 80 into fluid chamber 66C. However, the lands 58A-C block off the outlet fluid ports 70, 72, 74, 76 from the fluid chambers 66B and 66C In order to provide hydraulic fluid 14 to the third and fourth fluid flow paths 30, 32, the solenoid 90 is activated such that the armature 92 moves the valve 40 to the third position, as shown in FIG. 4. Hydraulic fluid 14 enters the multiplexing valve assembly 12 from the first input fluid flow path 18, through the first inlet port 78 into fluid chamber 66B. The hydraulic fluid 14 is then directed out the third outlet port 74 to the third fluid flow path 30. Hydraulic fluid 14 also enters the multiplexing valve assembly 12 from the second input fluid flow path 20, through the second inlet port 80 into fluid chamber 66C. The hydraulic fluid 14 is then directed out the fourth outlet port 76 to the fourth fluid flow path 32. Any hydraulic fluid 14 located in the first fluid flow path 26 communicates through the first fluid outlet port 70, through the opening 62A in land 58A, through the radial fluid passage 60A to the center passage 50, out through the first end 52 of the valve 40 through the fluid chamber 66A and out the exhaust port 82. Likewise, any hydraulic fluid 14 located in the second fluid flow path 28 communicates through the second fluid outlet port 74, through the opening 62B in land 58B, through the radial fluid passage 60B to the center passage 50, out through the first end 52 of the valve 40 through the fluid chamber 66A and out the exhaust port 82.

Figure 5:
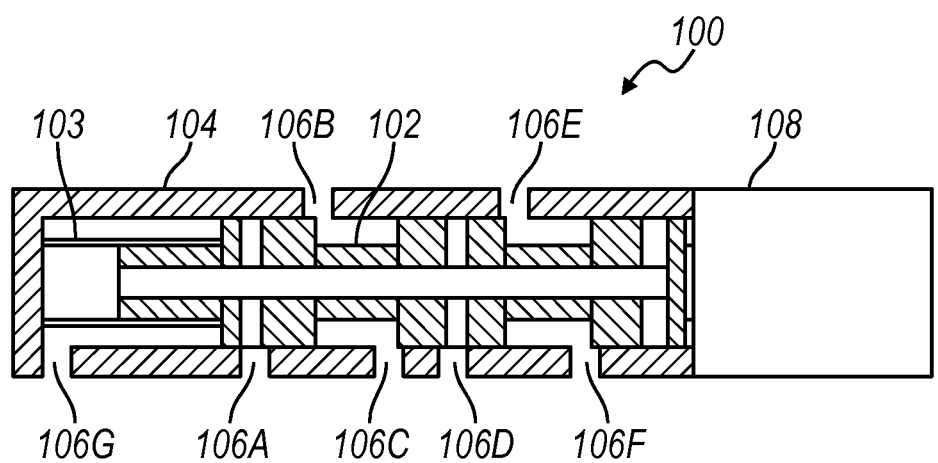
FIG. 5 is a schematic diagram of another embodiment of a multiplexing valve assembly according to the principles of the present invention.

Turning to FIG. 5, an alternate multiplexing valve assembly according to the principles of the present invention is generally indicated by reference number 100. The multiplexing valve assembly 100 is substantially similar to the multiplexing valve assembly 12 described in FIGS. 1-4 and includes a valve 102 and biasing member 103 that operates in the same manner as the valve 40 and biasing member 67. However, the valve 102 and biasing member 103, instead of being disposed within a valve body, is disposed within a self contained sleeve 104. The sleeve 104 includes a plurality of input and output ports 106A-G substantially identical to the ports 70, 72, 74, 76, 78, 80, and 82 in the valve body 42. Additionally, the multiplexing valve assembly 100 includes a solenoid 108 that is directly connected to the sleeve 104. Alternatively, the solenoid 108 can be a stand alone unit hydraulically connected to the multiplexing valve assembly 100. Accordingly, the multiplexing valve assembly 100 is packaged as a single modular structure or solenoid cartridge that may be directly connected to an existing hydraulic control system with minimal effort.

The description of the invention is merely exemplary in nature and variations that do not depart from the gist of the invention are intended to be within the scope of the invention. Such variations are not to be regarded as a departure from the spirit and scope of the invention.

We claim the following:

1. A valve assembly comprising:
   a valve body that defines a bore, wherein the valve body includes at least a first port, a second port, a third port, and an exhaust port in communication with the bore, and wherein the first, second, third, and exhaust ports are radially disposed with respect to the bore;
   a valve slidably disposed within the bore and moveable between at least a first position and a second position, the valve having a body with a first end and a second end and at least one land disposed on the body, wherein the body is coaxial to the bore and defines a fluid passage that communicates with a first opening in the body, wherein the first opening communicates with the exhaust port of the valve body, and wherein the land includes an outer surface sealable against the valve body, and wherein the land defines a radial fluid passage in communication with the fluid passage and with a second opening disposed on the land;
   a biasing member disposed within the bore of the valve body and the first end of the valve is disposed within the biasing member, the biasing member in contact with an outer surface of the at least one land of the valve and operable to bias the valve to one of the first and second positions; and
   a control device operatively associated with the valve, the control device operable to move the valve to at least one of the first and second positions against the bias of the biasing member, and
   wherein the valve allows fluid communication between the first port and the second port when in the first position and wherein the valve allows fluid communication between the second port and the third port when in the second position and wherein the first end of the valve is disposed on a stem that extends from the land, and wherein the biasing member is supported on and contacts a majority of an outer peripheral surface of the stem of the valve.

2. The valve assembly of claim 1 wherein the second opening is located on the outer surface of the at least one land.

3. The valve assembly of claim 1 wherein the fluid passage is linear and coaxial with the body.

4. The valve assembly of claim 1 wherein the first opening is located on the first end of the valve.

5. The valve assembly of claim 1 wherein the radial fluid passage is perpendicular to the fluid passage.

6. The valve assembly of claim 1 wherein the control device is an on/off solenoid or a variable force solenoid.

7. The valve assembly of claim 6 wherein the control device is a direct acting solenoid in contact with the second end of the valve.

8. The valve assembly of claim 1 wherein the first port is in fluid communication with a source of pressurized hydraulic fluid.

\* \* \* \* \*